United States Patent

[11] 3,540,639

| [72] | Inventors | Marshall A. Carlson<br>Ashville;<br>Norbert L. Nelson, Jamestown, New York |
|---|---|---|
| [21] | Appl. No. | 803,324 |
| [22] | Filed | Feb. 28, 1969 |
| [45] | Patented | Nov. 17, 1970 |
| [73] | Assignee | AVM Corporation<br>Jamestown, New York |

[54] DEGATING FIXTURE
10 Claims, 8 Drawing Figs.

[52] U.S. Cl. ................................................. 225/97,
225/100
[51] Int. Cl. .................................................... B26f 3/00
[50] Field of Search............................................ 225/97,
100, 101, 93, 103

[56] References Cited
UNITED STATES PATENTS

| 3,172,588 | 3/1965 | Bertold et al. .............. | 225/97UX |
| 3,446,407 | 5/1969 | Dawson ..................... | 225/97 |

Primary Examiner—Frank T. Yost
Attorney—Bean and Bean

ABSTRACT: A fixture for simultaneously degating a plurality of molded plastic articles connected by gate portions to a common runner system, including means to constrain the runner system and means to translate the articles with respect thereto, whereby the articles are separated by tension failure of the gate portions.

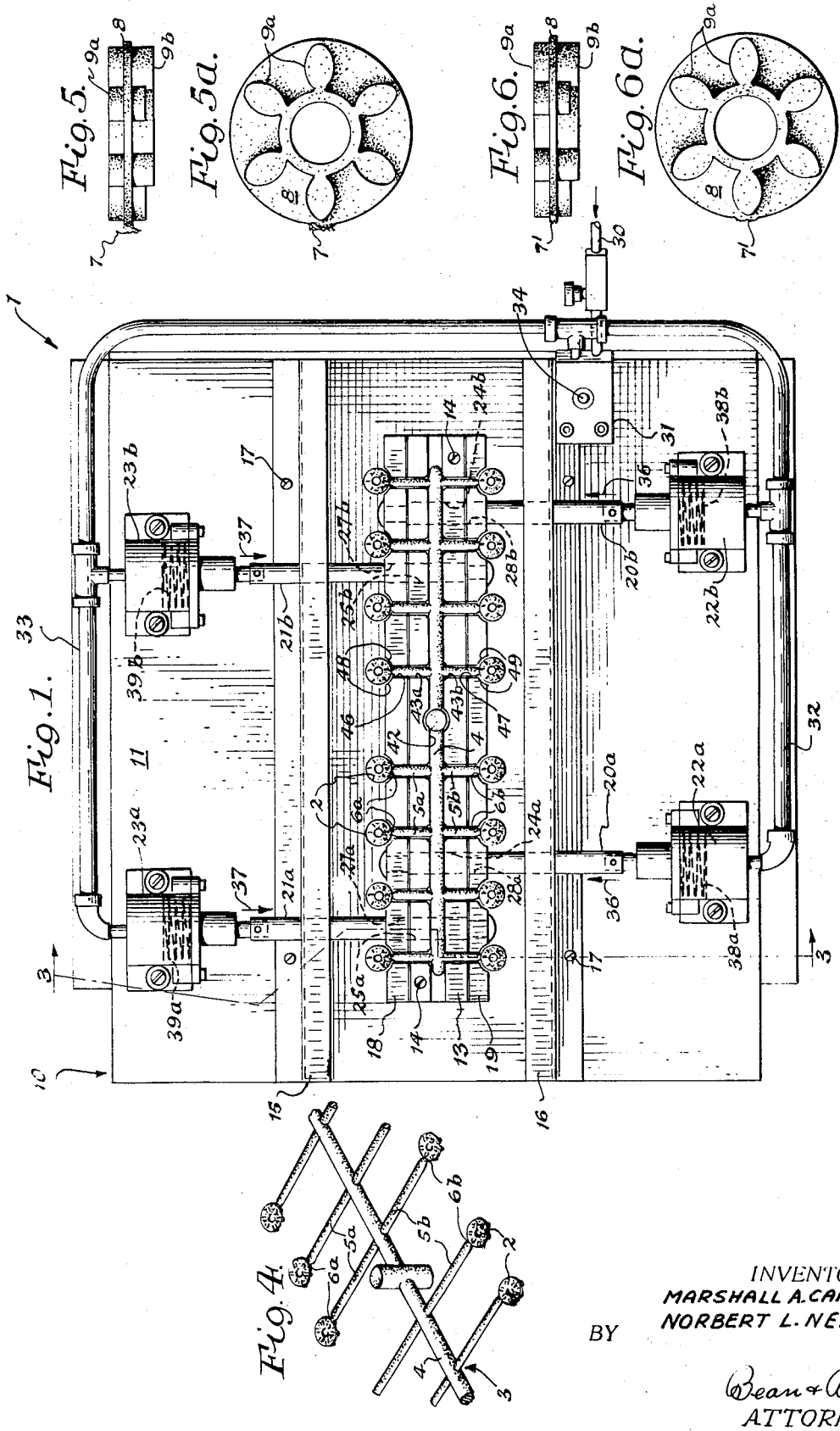

Patented Nov. 17, 1970
3,540,639
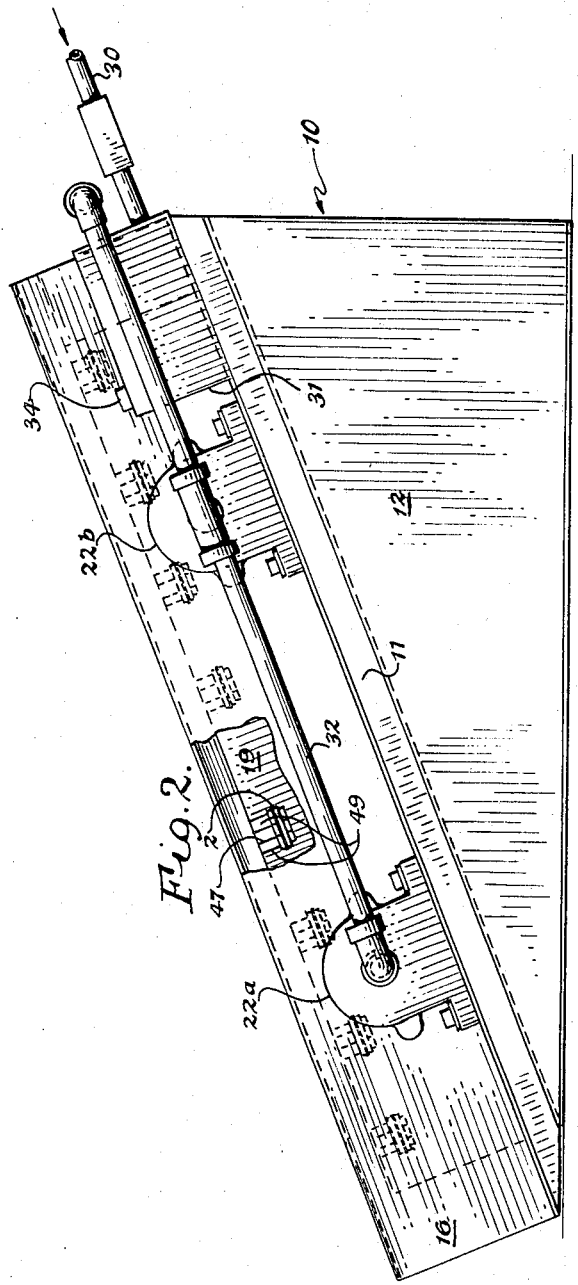
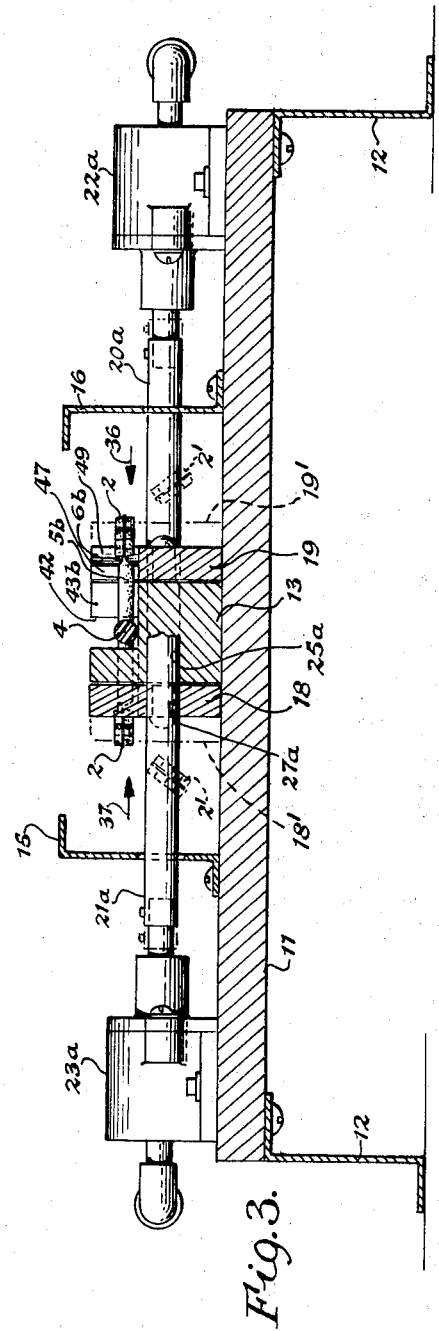
INVENTORS
MARSHALL A. CARLSON
NORBERT L. NELSON
BY
Bean+Bean
ATTORNEYS

DEGATING FIXTURE

BACKGROUND OF THE INVENTION

Conventionally, when employing an injection molding procedure to simultaneously form a plurality of plastic articles, the formed articles are connected together by material which has been solidified in the runner system of the forming mold. Thus it is necessary to separate or detach the formed articles from their interconnecting medium either before or subsequent to their removal from the mold in order that the articles may be put to articles, separation intended use.

While various arrangements have been proposed for use in separating articles before their removal from the confines of the forming mold, such arrangements require complex and thus costly mold constructions and, so far as we are aware, are not suitable for use in separating from a common runner system a plurality of relatively small-sized plastic articles. Therefore, as a practical matter, in the case of the small-sized articles. Separation is effected subsequent to their removal from the mold. Further, in that the relatively low individual cost of articles of this type requires a high-speed separating operation, it has been the practice to employ a driving cutter to sever or shear the gate portions which serve to connect the articles to the runner system. However, portions of the articles themselves are ofttimes severed because of misalignment of the gate portions with respect to the cutter, and in the case of certain types of material and article designs, the portions of the severed gate remaining on the articles requires that the articles be individually hand polished before they can be put to use.

SUMMARY OF THE INVENTION

The present invention is directed towards a fixture for degating plastic articles formed by injection molding techniques and more particularly to separating pinions by tension failure of the gate portions which connect central webs of such pinions to a common runner system.

The fixture includes a block fixed to a stationary platform, a pair of guides fixed to the platform on opposite sides of the block, and a pair of separator bars mounted for reciprocating movement transversely of the block intermediate such block and the guides. The block functions to constrain the runner system to which the pinions are attached from movement transversely of the block, such that when the separator bars are moved transversely away from the block, they engage and translate the pinions away from the constrained runner system so as to effect tension failure of the connecting gate portions. The separator bars and guides thereafter cooperate to form a pair of chutes to assist removal and collection of the thus separated pinions. Movement of pinions through the chutes may be gravity assisted by inclining the platform on which the elements of the fixture are mounted.

Utilization of the fixture of the present invention permits relatively high-speed separation of small sized plastic pinions from a common runner system, while preventing the damage to such pinions ofttimes occurring when means are employed to sever or shear the pinion connecting gate portions. Furthermore, it insures that any flash remaining on the separated pinions will lie within the plane of the pinion web, thereby permitting any such flash to be unobjectionable from the standpoint of pinion performance during use.

DRAWINGS

The nature and mode of operation of the fixture of the present invention will now be fully described in the following detailed description taken with the accompanying drawings:

FIG. 1 is a top plan view of the fixture of the present invention;

FIG. 2 is a side elevational view of the fixture shown in FIG. 1;

FIG. 3 is a sectional view taken generally along line 3–3 of FIG. 1;

FIG. 4 is a perspective view showing a plurality of injection molded plastic articles carried by a common runner system;

FIGS. 5, 5a are side elevational and top plan views of a pinion separated in accordance with conventional practice; and FIGS. 6, 6a are side elevational and top plan views of a pinion separated by the fixture of the present invention.

DETAILED DESCRIPTION

The fixture of the present invention, which is generally designated as 1 in FIG. 1, is particularly adapted for use in separating a plurality of relatively small plastic articles 2, which, as indicated in FIG. 4, are interconnected upon removal from their forming mold by a common runner system 3. Runner system 3 is shown for purposes of reference as having a main runner 4 and a plurality of branch runners 5a, 5b, which are connected adjacent their inner ends to main runner 4 such as to project substantially transversely therefrom, and are connected at their outer ends to articles 2 by relatively small cross section gate portions 6a, 6b.

Since manual separation of articles 2 on an individual basis would be an expensive, time-consuming operation, it has been customary to employ a cutting or shearing machine having a blade sufficiently long to permit all articles on one side of the runner system to be simultaneously separated, as by cutting through all of gate portions 6a or 6b. However, ofttimes the articles are damaged during a severing operation due to misalignment of the severing blade with the gate portions to be severed. Moreover, it has been found that even if the gate portions are properly severed, such gate portions are deformed during severing so as to form a flash portion 7, which projects in one or both directions transversely of the plane of the severed gate, as best shown in FIGS. 5, 5a. The occurrence of cutting flash 7 is particularly prevalent in certain types of plastic materials, including polycarbonates, which, while strong, tend to flow when severed in the manner described.

The occurrence of cutting flash 7 is objectionable when it extends or projects into areas of the articles which are adapted to cooperate or surface abut against devices or mechanisms with which such articles are adapted to cooperate. This, as illustrated in the drawings, where the articles are in the form of pinions having a central web 8 and gear teeth 9a, 9b, carried on opposite sides thereof, the presence of cutting flash tends to interfere with or prevent proper meshing of gear teeth 9a, 9b with cooperating gear teeth, not shown, of other pinions with which the pinion in question is to be operably associated.

Pinions of the design illustrated in the drawings are employed as voting counter unit pinions in voting machines of the type manufactured and sold by the Automatic Voting Machine Corp., the assignee of the present invention.

Now referring to FIGS. 6 6a, it will be understood that fixture 1 is adapted t to constrain runner unit 3 and thereafter simultaneously pull or "pluck" all of the articles 2 therefrom, such that the articles are separated by the tension failure of gate portions 6a, 6b. Thus, when the articles are in the form of pinions, resulting tension flash 7' lies only within the plane of web 8, so as not to interfere with the operation of gear teeth 9a, 9b.

Now referring particularly to FIGS. 1–3, it will be seen that fixture 1 includes a platform support 10 having a stationary base or a mounting plate 11, which is preferably supported at an angle with respect to horizontal by a pair of supporting flanges 12. Fixture 1 also includes an elongated, runner system constraining block 13, which is suitably fixed to plate 11, as by screws 14; a pair of guide flanges 15, 16, which are suitably fixed to plate 11 on opposite sides of block 13, as by screws 17; and a pair of stripper bars 18, 19, which are affixed to the free ends of piston rod extensions 20a, 20b and 21a, 21b of single action pneumatic cylinders 22a, 22b and 23a, 23b, respectively, for reciprocating movement transversely of block 13 intermediate the block and guide flanges 15, 16. It will be understood that guide flanges 15, 16 cooperate with stripper bars 18, 19, respectively, to define a pair of discharge guides or passageways for receiving and guiding to a collection point, articles 2 when the articles are are separated upon operation of fixture 1 in the manner to be described.

Block 13 is provided with transversely extending through bore openings 24a, 24b and 25a, 25b which are adapted to slidably receive piston rod extensions 20a, 20 b and 21a, 21b, respectively, whereas stripper bars 18 and 19 are provided with transversely extending through bore openings 27a, 27b and 28a, 28b, which are adapted to slidably receive piston rod extensions 21a, 21b and 20a, 20b, respectively. By this arrangement, the free ends of the piston rod extensions, which are weighted down by stripper bars 18, 19, are properly supported and the stripper bars constrained for relatively aligned reciprocating movement with respect to block 13.

Air pressure for operating cylinders 23a, 23b is supplied through main line 30, manually operated to flow valve 31 and branch lines 32, 33. Valve 31 includes a pushbutton operator 34, which, when depressed, serves to connect branch lines 32, 33 to main line 30, such that pressurized air is simultaneously admitted to cylinders 22a–23a. When pressurized air is admitted to cylinders 22a–22b piston rod extensions 20a, 20b and 21a, 21b are extended in the direction indicated in FIGS. 1 and 3 by arrows 36 and 37, respectively and thereby move bars 18, 19 into their operative or article separating positions, illustrated in phantom in FIG. 3. Upon release of push button 34, branch lines 32, 33 are vented to atmosphere and suitable springs 38a–39b, which are enclosed one within each of cylinders 22a–23b, respectively, serve to retract piston rod extensions 20a–21b to their original or rest positions, wherein separating bars 18, 19 are again disposed in their full line positions, indicated in FIGS. 1 and 3.

Again referring to FIGS. 1 and 3, it will be seen that stationary block 13 is provided with a system of interconnecting channels, including main channel 42 and branch channels 43a, 43b, which are dimensioned to receive the main runner 4 and branch runners 5a, 5b, respectively, of the runner system illustrated in FIG. 4. Branch channels 43a, 43b have ends opening transversely of block 13, which open ends are spaced from main channel 42 such as to permit at least the projecting end portions of branch runners 5a, 5b to extend outwardly therethrough. Also, as best shown in FIG. 1, stripper bars 18, 19 are provided with transversely extending through channels 46, 47, which are disposed in alignment with the open ends of branch channels 43a, 43b and adapted to receive the projecting end portions of branch runner 5a, 5b, respectively. Bounding the oppositely facing outlet ends of stripper bar channels 46, 47 are concave surface portions 48, 49, respectively, which generally conform to the contour of and are adapted to be brought into engagement with articles 2 adjacent gate portions 6a, 6b. Preferably, stripper bars 18, 19 and block 13 are dimensioned such as to permit a slight initial spacing between surface portions 48, 49 and articles 2 in order to facilitate placement of the runner system.

In operation of fixture 1, a user need merely place the runner system to which articles 2 are attached into the channel system of stationary block 13 and the channels of the stripper bars, as best shown in FIG. 1. When the runner system is thus positioned, main channel 42 serves to constrain the runner system from movement transversely of block 13, whereas branch channels 43a, 43b and stripper bar channels 46, 47 serve to properly orient branch runners lengthwise of block 13 and articles 2 with respect to stripper bar surface portions 48, 49. Thereafter, when pushbutton operator 34 is depressed, pressurized air is applied to cylinders 22a–23b, whereby stripper bars 18, 19 are simultaneously moved in opposite direction transversely away from block 13 into their phantom line positions shown in FIG. 3. During movement of stripper bars 18, 19, contact surfaces 48, 49 are brought into engagement with articles 2 and thereafter effect translation thereof through a distance sufficient to cause tension failure of gate portions 6a, 6b and resultant separation of the articles, as indicated in phantom at 2' in FIG. 3. Separated articles 2' then roll slide down inclined base plate 11 to a suitable collector, not shown, through a pair of guides or passageways defined by stripper bars 18, 19 and guide flanges 15, 16, respectively.

If desired, air jets, not shown, may be employed in place of or as an adjunct to the force of gravity to insure movement of articles 2'.

Also, if desired, block 13 may be modified by replacing the channel system by a plurality of upstanding pegs, or pins, which serve to properly orient and constrain the runner system.

We claim:

1. A fixture for simultaneously degating the plurality of molded plastic articles connected together by a runner system including a main runner and a plurality of branch runners connected adjacent their inner ends and extending transversely from said main runner, said articles being attached to the projecting end portions of said branch runners by reduced diameter gate portions, said fixture comprising in combination:
    a stationary block, said block having means adapted to constrain movement of said main and branch runners in a direction transversely of said block, said block being dimensioned such that when said runners are constrained, said articles project transversely from said block;
    a stripper bar mounted adjacent said block for reciprocating movement in alignment with said direction, said bar having means engagable with said articles; and
    means to reciprocate said bar such that when said bar is moved away from said block said engagable means serve to translate said articles and thereby separate said articles from said projecting end portions of said branch runners by tension failure of said gate portions.

2. A fixture according to claim 1, wherein said constraining means is s system of interconnecting main and branch channels provided in said block and dimensioned to receive said main and branch channels of said runner system.

3. A fixture according to claim 2, wherein said stripper bar is provided with a plurality of channels adapted to receive the projecting end portions of said branch runners extending transversely outwardly from said block branch channels, and said engaging means is in the form of surfaces bounding said separating bar channels.

4. A fixture according to claim 3, wherein said surfaces generally conform to the contour of and are adapted to engage with said articles adjacent aid gate portions.

5. A fixture according to claim 1, wherein there is additionally provided in combination a panel and a stationary guide means, said block and guide means being fixed to said panel, said separating bar being movable over said panel intermediate said block and said guide means, whereby said separating bar and said guide means cooperate with said panel to form a guide chute for separated articles.

6. A fixture according to claim 1, wherein a pair of separating bars are provided, said bars being mounted adjacent opposite sides of said block and being substantially simultaneously movable in opposite directions with respect to said block.

7. A fixture according to claim 6, wherein there is additionally provided in combination a panel and a pair of stationary guides, said block and said guides being fixed to said panel with said block being disposed intermediate said guides, said separating bars being movable over said panel one intermediate each said guides and said block, whereby said separating bars and said guides cooperate with said panel to form a pair of guide chutes for separated articles.

8. A fixture according to claim 6, wherein said means for reciprocating said separating bars includes fluid-operated cylinders provided at least one for each said separating bar, said separating bars and said cylinders associated therewith being disposed on opposite sides of said block and interconnected by piston rods slidably extending through said block in a direction extending transversely thereof.

9. A fixture according to claim 8, wherein said constraining means is a system of interconnecting main and branch channels provided in said block and dimensioned to receive said main and branch channels of said runner system.

10. A fixture according to claim 9, wherein said stripper bars are provided with a plurality of channels adapted to receive the projecting end portions of said branch runners extending transversely outwardly from said block branch channels, and said engaging means is in the form of surfaces bounding said separating bar channels.